United States Patent Office 3,344,726
Patented Oct. 3, 1967

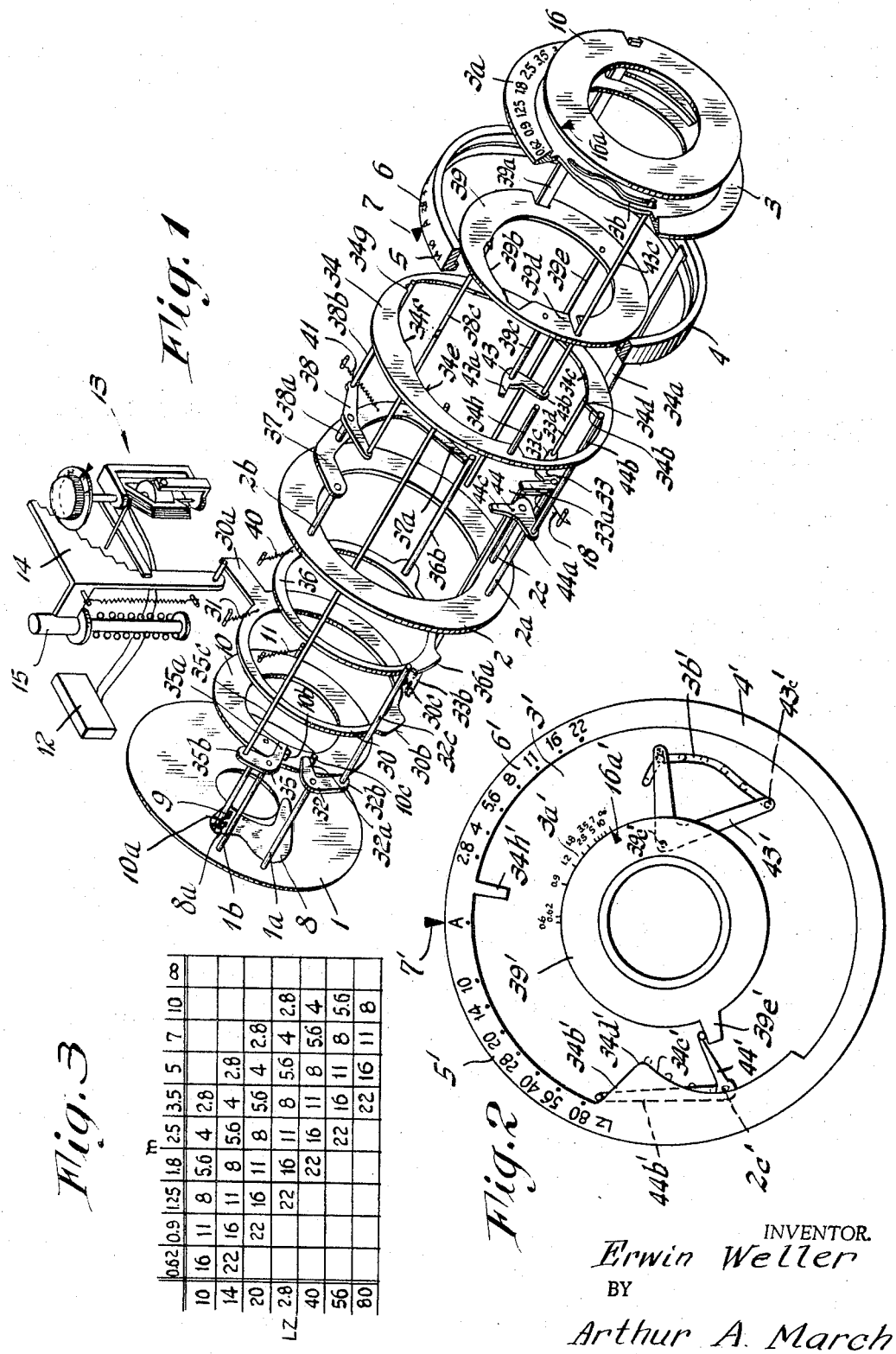

3,344,726
PHOTOGRAPHIC CAMERA WITH CONTROLLED DIAPHRAGM SETTING
Erwin Weller, Calmbach (Enz), Germany, assignor to Alfred Gauthier, G.m.b.H., Calmbach (Enz), Germany, a corporation of Germany
Filed July 13, 1964, Ser. No. 382,285
Claims priority, application Germany, July 12, 1963, G 38,177
4 Claims. (Cl. 95—64)

ABSTRACT OF THE DISCLOSURE

This invention relates to a photographic camera with a variable aperture diaphragm having a minimum and maximum aperture settings. A distance value setting member and a guide number setting member are provided on the camera for cooperation with a differential mechanism having a first input connection to the distance value setting member and a second input connection to the guide number setting member. Further a diaphragm control is provided for the camera which is connected to the differential mechanism for actuation thereby. This diaphragm control is also connected to the diaphragm to control the size of the aperture. In addition, locking means is provided which is engageable with the distance value setting member in order to prevent the latter from being set at a value outside of a range determined by the guide number equation, viz., guide number=distance value×diaphragm value, and by the minimum and maximum aperture setting of the diaphragm. The locking means also provides for returning the distance value setting member to this range after the guide number setting member has been set.

---

This invention relates to a photographic camera having a diaphragm, the operation of which is controlled over a photographic flash range according to the guide number equation guide number=distance value×diaphragm value in response to the setting of the camera for a particular guide number determined by the flash bulb being used and in accordance with the distance value set by the respective setting member which is operatively connected to the diaphragm setting member by means of a differential control apparatus.

In accordance with standard usage, such a setting device for the diaphragm will be referred to hereafter as an "Automatic Flash System." In cameras provided with this system and in which there is a system diaphragm range available, it is possible to indicate, for a specific guide number, a specific distance range within which properly exposed photographs may be taken. If the distance is either greater or less than this range, the lens aperture can no longer be set to the proper value and will either be not stopped down enough, in which case the photographs will be overexposed, or will be of too small a maximum aperture size so that the photographs will be underexposed.

In order to avoid faulty exposures in operating with the automatic flash system, the guide number setting member and the distance setting member in cameras equipped with automatic flash systems have hitherto been provided with stepped cams which are opposite each other and slope in the opposite directions. Such cameras have included a lever located between the stepped cams and provided with two stop lugs that cooperate with the steps. One of the characteristics of the prior mechanism is that the guide number setting member cannot be rotated to the desired guide number as long as the distance for which the camera is focused is too small since the guide number setting member is held at one of its steps by the stop lever positioned by the stepped cam of the distance setting member. The guide setting member is released only when the distance has been set to at least the permissible lower limit. Accordingly, when a specific guide number has been set, the lower distance range in which proper operation cannot take place is blocked.

However, such an arrangement has a disadvantage in that there is no blocking of distances above the correct range, which means that underexposed photographs are possible. Moreover, the existing overexposure locking device is rather unsatisfactory in its operation because the guide number setting member is blocked when the initial distance setting is wrong since the distance must then be especially reset and only then it is possible to set the desired guide number.

It is one object of the present invention to avoid these disadvantages and to create a photographic camera with an automatic flash system which reliably avoids faulty exposures in the flash range and which, if required, sets the distance setting member automatically and dependently of the presetting of the guide number.

According to the present invention there are means provided which, after the guide number value is imparted to a differential mechanism, prevent the setting member used for imparting the distance value from being set at a distance value outside of the range determined by the guide number equation. The apparatus moves the setting member to the lower or upper limit of the range if, when the guide number value is imparted, the setting member occupies a position corresponding to a value outside of the permissible range. In this way reliable means are provided to avoid overexposure or underexposure of the film in making flash photographs. This is because it is impossible for the distance setting member to occupy a setting position at the end of the setting process which corresponds to a value outside of the proper diaphragm aperture range corresponding to the correct guide number.

In accordance with a further proposal of the invention, a reliable and simple structure is provided which takes up little structural space and which comprises two levers as means for the bilateral limiting of the distance setting range or for returning the setting member designed to impart the distance value. One of these levers is rotatably mounted on a fixed axis and is controlled by a cam on the guide number value setting member. The free end of this lever cooperates with a pin arranged on the distance value setting member. The other lever is pivotally mounted on the latter setting member and is operatively connectible with a pin fixed on the guide number setting member.

In order to be less restricted in the external arrangement of the setting controls as regards the structure of the shutter, it is also advantageous for the setting member that imparts the guide number value into the differential mechanism to be non-rotatably connected to a manual control ring that may be set according to a guide number scale, while the distance setting member is non-rotatably connected to the front lens mount of the main lens.

If the angular movement of the manual control ring between the individual guide numbers differs from the angular movement of the front lens between the distance values of the focusing scale, it is possible to provide compensation according to this invention, very simply by means of that lever arranged on the distance setting member. This lever engages a fixed compensating cam which may be developed, for example, in the front plate of the shutter.

Details of the invention will be described in the following specification together with the drawings in which:

FIG. 1 shows a perspective, exploded view of an intra-lens shutter for photographic camera, which shutter is equipped with differential apparatus as well as with means which become operative in the photoflash range for limiting and returning the distance setting member;

FIG. 2 shows the details of a modified form of the self-regulating overexposure and underexposure locking device; and FIG. 3 is a table of diaphragm values for various guide numbers and distances.

The drawing illustrates an intra-lens shutter which comprises three fixed structural elements: A diaphragm base plate 1, a supporting ring 2 and a front plate 3. In addition, there are several rotatable rings or setting members which in the embodiment shown, are coaxial with the lens axis. They include a manual-control ring 4 having an identification mark A for automatic daylight setting, a guide number scale 5, and a diaphragm scale 6. The control ring 4 may be set with reference to a fixed pointer 7. When the control 4 is set so that its mark A is opposite the pointer 7, the diaphragm will be set automatically in response to light conditions, as will be described in detail below. The diaphragm scale 6 is used for setting different diaphragm values by hand, and the guide number scale 5 is used in conjunction with an automatic flash system in which the diaphragm is set by means of a differential gear (to be explained below) in response to the setting of a specific guide number value and distance value.

The individual members will be enumerated and discussed below in connection wit the above-mentioned three operating ranges to which they belong. The diaphragm lamellae 8, the setting of which is the essential factor in all three operating ranges, are pivotally mounted on a pin 9 in diaphragm base plate 1. For the sake of clarity, only one diaphragm lamella is shown in the drawing. A diaphragm lamella setting member, or ring 10, which is pulled clockwise by a tension spring 11, is connected to the diaphragm lamellae 8 by pins 10a engaging slots 8a. In addition, the diaphragm setting ring 10 has two actuating pins 10b and 10c.

The diaphragm lamellae 8 are to be set automatically for the amount of light on the scene measured by a photocell 12, which is part of an exposure meter 13, which also includes a sensing member 14 in the form of a slide that co-operates with a shutter release 15. The arrangement in this case is such that, when the shutter release is depressed to make an exposure, the sensing slide 14 rotates a first diaphragm control ring 30 by pressing upon its arm 30a. The ring 30 is biased by a spring 31 and has a cam 30b. The diaphragm setting ring 10 is actuated by a bell crank lever 32. This lever is pivotally mounted on the bearing pin 1a on the plate 1 and has an arm 32a that engages an actuating pin 10c. The other arm 32b has a sensing pin 32c that follows, and is therefore controlled by the cam 30b.

The automatic daylight system must be disconnected both for flash operation and for manual operation of the diaphragm. This is done by an arresting lever 33 which is pivotally mounted on a pin 2a on the supporting ring 2 and is urged clockwise by a spring 18. One arm 33a of the lever 33 comprises a bent-off lug 33b which is free to hook behind an edge 30c of the first diaphragm control ring 30 if the latter is in an end position in which the cam 30b is outside the range of control of its associated sensing pin 32c. The other arm 33c of the arresting lever 33 has a sensing pin 33d which is actuated by a setting member 34, which has several other functions to be discussed in detail hereinafter. Thet setting member 34 has a lug 34a, by which it is non-rotatably connected to the manual control ring 4, and a steeply sloping edge 34b and a cam 34c, which meet at a vertex 34d.

In the view shown in the drawing the automatic daylight system is in operation, i.e., the identification mark A is set on the manual setting ring 4, and the sensing pin 33d is located at the vertex 34d. The lug 33b is not hooked behind the edge 30c. As soon as the manual setting ring 4 and, thereby, the setting member 34 is moved in either the clockwise or counterclockwise direction, the sensing pin 33d moves radially away from the lens axis, which causes the lug 33b to move in front of the edge 30c, thus locking the automatic daylight system.

Manual setting of the diaphragm is effected by means of a bell crank lever 35 pivotally mounted on the diaphragm base plate 1 by means of a bearing pin 1b. One arm 35a of this lever presses against the actuating pin 10b of the diaphragm lamella ring 10, while a sensing pin 35c on a second arm 35b follows a cam 34e. The setting member 34 to which the latter cam is connected is operated by rotation of the manual control 4.

For the purpose of controlling the diaphragm in case of photoflash exposures, the invention provides a second diaphragm control ring 36 and a differential mechanism including a sickle-like lever 37 and a balance-beam lever 38 pivotally mounted near the center thereof by means of a pin 38a.

One side of the balance-beam lever 38 has a pin 38b that follows the setting member 34 while the other side has a pin 38c that engages a setting member 39 designed to take into consideration the distance value. The setting member 39 has a lug 39a bent off to engage the front lens mount 16. The mount 16, in turn, can be set by means of a mark 16a with respect to a distance setting scale 3a on the front plate 3.

The mode of action of the second diaphragm control ring 36 is similar to that of the first diaphragm control ring 30 which becomes operative when the automatic daylight system is in operation. The diaphragm control ring 36 is also biased toward its starting position by a spring 40, and it has a cam 36a that is engaged by the sensing pin 32c. The second diaphragm control ring 36 is moved against the action of the spring 40 by the sickle-like lever 37 which is pivotally mounted on a pin 2b on the carrying or supporting ring 2 with its free end 37a in position to strike against a pin 36b on the second diaphragm control ring 36. A spring 41 biases the lever 37 in the counterclockwise direction, as the shutter is shown in FIG. 1. A sensing pin 38b on the balance-beam lever 38 follows a control cam 34f and a steeply sloping edge 34g of the setting member 34 to transmit the guide number value into the differential mechanism comprising levers 37 and 38. FIG. 1 shows the sensing pin 38b in the position most remote from the axis. A second sensing pin 38c senses a cam 39b of the setting member 39.

As is known, the setting of too high a guide number in relation to a low distance value results in overexposure in the flash range. In order to avoid this, the above-described arrangement provides for means that prevent the setting member 39 from being set at too low a distance value. In addition, the means for accomplishing this may be arranged to return the setting member 39 to the lower or upper limit of its setting range, if, when the guide number value is set, the member 39 happens to occupy a position corresponding to a value outside the admissible range. For this purpose, a lever 43 may be pivotally mounted on a pin 39c on the setting member 39. When the manual control 4 and the setting member 34 are rotated clockwise, a pin 34h carries along the arm 43a of the lever 43. However, since the lever 43 has another arm 43b with a sensing pin 43c that penetrates an opening 39d in the setting member 39 and extends into a cam slot 3b in the fixed front plate 3, the lever is at first unable to rotate. As a result, the setting member 39 and the front lens mount 16 are moved concomitantly. The cam slot 3b is designed to adapt the angular paths of the manual control 4, which are determined by the intervals of the guide number scale 5, to the angular paths of the setting member 39 determined by the lens thread.

In case of small guide numbers and great distances, especially when the lens is focused at infinity, the photographs would be underexposed, and this must also be avoided. In this case, the manual control 4 must drive the setting member 39 in the opposite direction of rotation, for which purpose a lever 44 is mounted on a pivot pin 2c on the supporting ring 2. One arm 44a of the lever 44 has a sensing pin 44b mounted on it to be actuated by the sloping edge 34b and the cam 34c of the setting member 34. Another arm 44c of the lever 44 is located in the range of motion of a driving pin 39e of the setting member 39. If the camera is focused at infinity at the time the change is made from the automatic daylight system to the automatic photoflash system, the sloping edge 34b first causes the lever 44 to rotate clockwise and the latter, in turn, produces an opposite rotary motion of the setting member 39. After the pin 44b has passed the vertex 34d, which corresponds to movement of the scale 5, which brings the guide movement value 10 past the pointer 7, the lever 44 begins to pivot counter-clockwise so that increasingly large distance values are released, the maximum distance value being 10 m.

The mode of the operation of the foregoing apparatus is as follows:

*Automatic daylight system*

When the camera is set for automatic daylight operation with the manual control ring 4 placed so that the mark A is opposite the pointer 7, actuation of the shutter release 15 causes the sensing slide 14 to move downwardly until it comes to rest on the arm 30a of the first diaphragm control ring 30 and continued downward movement of the slide 14 rotates the ring against the force of the spring 31. During this motion the cam 30b slides under the sensing pin 32c, causing the lamellae 8 to close toward a smaller aperture setting. The setting of the diaphragm is dependent on which step of the slide 14 engages the needle of the exposure meter 13, as is well known. After the photographer lets go of the shutter release 15, it will return to the upper position under the force of its own spring, bringing the slide 14 with it and thereby permitting the ring 30 to return to its starting position under the force of the spring 31. As a result, the diaphragm lamellae ring 10 also returns to its starting position under the force of the spring 11, thereby moving the lamellae 8 out to their starting position, which corresponds to the position of the largest aperture.

*Manual setting of the diaphragm*

When the manual control ring 4 is rotated counter-clockwise so as to bring one of the numbers of the diaphragm scale 6 opposite the pointer 7, the setting member 34 moves simultaneously. This causes the sensing pin 33d, in effect, to slide over the sloping edge 34b thus rotating the arresting lever 33 clockwise so that the lug 33b hooks behind the edge 30c of the first diaphragm control ring 30, thereby preventing the latter from rotating when the shutter release 15 is actuated. The farther the manual control ring 4 is rotated in the counter-clockwise direction, the more closely will the sensing pin 35c of the bell crank lever 35 approach the optical axis in following the cam 34e. The lever 35 rotates clockwise so that its arm 35a drives the actuating pin 10b. This causes the diaphragm lamellae ring 10 to rotate counterclockwise against the force of the spring 11, thus rotating the lamellae 8 so as to stop down the aperture. These elements operate in the reverse direction when it is desired to change the diaphragm to a larger aperture size. The second diaphragm control ring 36 is prevented from interfering with the lever 32 because the cam 36a moves away from the sensing pin 32c. The cams 34f and 39b which control the balanced-beam lever 38 give the lever 38 and the sickle-shaped lever 37 sufficient space to move aside.

*Automatic flash system*

It will first be assumed that the normal case consists in having the setting member 39 located a medium distance value; for example, at 3.5 meters, or 3.5 m., when the manual control ring 4 is rotated clockwise to change from the automatic position marked A to the photoflash range in which some guide number within the scale 5 will be brought opposite the pointer 7. In this case the sensing pin 33d slides off along cam 34c so that the first diaphragm control ring 30 will be locked by means of the arresting lever 33 after the manual control ring 4 has passed the guide number value 10. Looking at the cam 34e it will be seen that the lever 35 with its sensing pin 35c does not make any motion which might interfere with having the diaphragm set with respect to the guide number value and the distance value. Of primary importance is the second diaphragm control ring 36 which sets the diaphragm lamellae 8 by means of the cam 36a, which exerts control over the lever 32 in the manner described under the section entitled, "Automatic Daylight System." The pin 36b of the second diaphragm control ring 36 engages the free end 37a of the sickle-shaped lever 37 under the force of the spring 40. The contol ring 36 in turn responds to the angular position of the lever 37 which carries the balanced-beam lever 38.

In accordance with the assumption that a medium distance value was set initially, it is necessary to assume that the sensing pin 38c of the lever 38 engages approximately the central position of the cam 39b. When the manual control ring 4 changes from the automatic mark A to the guide number value 10 the sensing pin 38b moves up over the sloping edge 34g of the setting number 34. This causes the balanced-beam lever 38 to rotate clockwise about the pin 38c thus driving the sickle-shaped lever 37. This causes the second diaphragm control ring 36 to rotate clockwise through a small angle so that the sensing pin 32c engages the beginning point of the cam 36a. If the manual control ring 4 is rotated more in the direction of higher guide number values, the sensing pin 38b will slide over the cam 34f and will thus approach the optical axis more closely. The balanced-beam lever 38, the sickle-shaped lever 37, and the second diaphragm control ring 36 all undergo clockwise rotations which cause the diaphragm lamellae 8 to move to positions of smaller aperture size. Since the higher guide number values correspond to greater light intensity from the artificial source, and since the distance was assumed to be constant, the stopping down of the aperture is justified.

Conversely, if a specific guide number value is assumed to be the constant factor and if the setting member 39 is rotated counterclockwise, which would be in the direction toward smaller values of distance, the sensing pin 38c is moved closer to the optic axis, thereby resulting in a counterclockwise rotation of the lamellae 8 toward a position of smaller diaphragm aperture. This is also justified since it is necessary to reduce the aperture of the diaphragm when a source of light is brought closer to the object to be photographed. If the camera is moved farther from the object to be photographed, the focusing will have to be changed accordingly and the movements just described will be carried out in reverse.

The method of operation of the locking and resetting device to prevent overexposures and underexposures in the flash range of the camera will be explained next.

(a) *Overexposure locking device*

Overexposures occur only at small distances. For exemple: assume a photograph to be taken at a distance of about .62 meter, or approximately two feet. Let it be assumed in addition that the manual control ring 4 is moved so as to bring the scale 5 into position opposite the pointer 7. While a diaphragm value of 16 may be set by the automatic system when the guide number value 10 is reached, the automatic system reaches the end of its range with the setting of a diaphragm value of 22, which will be assumed to be the smallest aperture available with a particular lens, when the guide number value is set at 14. Since it has been assumed that the lens is not capable of being stopped down to a smaller value than 22, it is not possible to use a higher guide number than 14. In the meantime, the pin 34h of the setting number 34 has come into engagement with the lever 43. If the guide number value 20 is now set, the arm 43a of the lever 43 will be rotated by the pin 34h. However, this is not possible since the lever 43 is controlled by the engagement between its pin 43c and cam slot 3b of the front plate. Thus the movement of the arm 43a means a simultaneous movement of the setting member 39 as well as of the front lens mount 16 to the next greater focal distance of .9 meter. If the guide number values are still higher, the setting member 39 will be driven still farther in the clockwise direction.

(b) *Underexposure locking device*

Underexposures occur when the distance from the source of the light to the object to be photographed is too great. For example, let it be assumed that the camera is focused at infinity but that otherwise the conditions are the same as in the case of the overexposure apparatus just described. In this case the pin 39e engages the arm 44c of the lever 44. If the guide number value is 10, the distance of 3.5 meters corresponds to the largest possible lens aperture which, for the sake of example, is assumed to be 2.8, if the calculations are based on the guide number equations $L=B \times E$. This distance value of 3.5 meters must therefore be set when passing from the identification mark A to the guide number value 10. This is the case because the sensing pin 44b moves over the entire sloping edge 34b to the vertex 34d while the lever 44 is undergoing its greatest possible clockwise rotation. During this motion, the setting member 39 is carried along in the opposite direction away from the distance value corresponding to the "infinity" until the distance value 3.5 m. is reached. If the light sources are more intense and the guide number settings are correspondingly higher, adequate illumination of progressively greater distances becomes possible. Consequently, while the sensing pin 44b slowly descends along the cam 34c and the lever 44 goes through a corresponding counterclockwise rotation, it becomes increasingly possible to set greater distances since the pin 39e is able to follow the lever arm 44c.

FIG. 2 is a diagrammatic view of the overexposure and underexposure locking devices and makes it possible to obtain a better understanding of the paths of motion of the levers 43 and 44 designed to limit and return the distance setting member 39 in cooperation with the cam 34c associated with the lever 44. The setting member 34 designed to impart the guide number, and the manual control ring 4 associated with the setting member 34, are combined into a ring 4' in FIG. 2. This combined ring has a guide number scale 5' and a diaphragm scale 6' on opposite sides of identified mark A for the automatic daylight system. The scales and the identified mark are set with reference to a fixed pointer 7'. The ring 4' also has a steeply sloping cam section 34b' which meets another cam section 34c' at an apex, or vertex 34d'. A radially inwardly directed lug 34h' corresponds to the pin 34h of the setting member 34 for imparting the guide number according to the apparatus of FIG. 1. The setting member 39 of FIG. 1 designed to impart distance information is shown diagrammatically in FIG. 2 by a ring 39' having a lug 39e' which corresponds to the pin 39e. The relation to a fixed distance scale 3a' is determined by means of a setting mark 16a' on the ring 39'. The other members shown in FIG. 2 have the same reference numerals as their counterpart in FIG. 1 except for the addition of a prime. These are the two levers 43' and 44', the pins 39c' and 2c' on which they are pivotly mounted, and the fixed cam 3b' in the front plate 3'.

The mode of the operation of the apparatus in FIG. 2 corresponds to that in FIG. 1. In FIG. 2 the apparatus is shown with the distance scale 3a' set at infinity, while the ring 4' is set with the automatic mark A opposite the fixed pointer 7'. If the ring 4' is rotated clockwise so that the setting is changed to bring one of the numerals in the guide number range 5' opposite the pointer 7', one arm 44b' of the lever 44' will travel along the steeply sloping cam section 34b' until it reaches the apex 34d' at the same time that the guide number 10 reaches a location opposite the pointer 7', in which case the arm 44b' drives the setting member 39' to the upper limit of the distance range. If higher guide number values are set, the arm 44b' travels along cam section 34c' which permits greater distance values to be set.

If the setting member 39' is placed at too low a distance value at the start, it will be moved along by means of the lug 34h' operated by means of the lever 43'. Because of the compensating cam 3b', which guides the lever 43', the driving movement of the setting member 39' first takes place in such a manner that the setting member 39' is moved through a greater angular distance than the ring 4', but this angular distance becomes smaller towards the end of the motion. If the rotation of the distance setting member 39' is in the opposite direction, the lug 34h' acts as a limiting stop.

What is claimed is:

1. A photographic camera comprising: a variable aperture diaphragm having maximum and minimum aperture settings; a distance value setting member; a guide number setting member; a differential mechanism having a first input connection to said distance value setting member and a second input connection to said guide number setting member; a diaphragm control connected to said differential mechanism to be actuated thereby and connected to said diaphragm to control the size of aperture thereof; and locking means engageable with said distance value setting member for preventing the latter from being set at a value outside of a range determined by the guide number equation guide number=distance value×diaphragm value and by the minimum and maximum aperture settings of said diaphragm and for returning said distance value setting member to said range after said guide number setting member has been set.

2. A photographic camera comprising: a variable aperture diaphragm; a distance value setting member; a guide number setting member; a differential mechanism having a first input connection to said distance value setting member and a second input connection to said guide number setting member; a diaphragm control connected to said differential mechanism to be actuated thereby and connected to said diaphragm to set the size of aperture thereof; and locking means for limiting the distance value setting range respective for returning said distance value setting member comprising a first lever rotatably mounted on said distance value setting member, a pin on said guide number setting member engageable with said lever, a second lever pivotally mounted to rotate about a fixed axis, a cam on said guide number setting member, said second lever being engageable with said cam to be moved thereby.

3. A photographic camera according to claim 2 comprising, in addition: a manual control ring; a guide number scale associated with a predetermined segment of said ring; and a front lens mount, said guide number setting member being non-rotatably connected to said manual control ring, and said distance value setting member being non-rotatably connected to said front lens mount.

4. A photographic camera according to claim 3 comprising, in addition: a front plate and a compensating cam thereon, said first lever engaging said compensating cam to be partially controlled thereby.

References Cited

UNITED STATES PATENTS

| | | | |
|---|---|---|---|
| 3,075,442 | 1/1963 | Koppen et al. | 95—10 |
| 3,118,356 | 1/1964 | Sauer et al. | |
| 3,128,168 | 4/1964 | Gunther et al. | 95—10 XR |
| 3,162,111 | 12/1964 | Koppen et al. | 95—10 XR |
| 3,169,464 | 2/1965 | Koppen | 95—64 |

NORTON ANSHER, *Primary Examiner.*

J. F. PETERS, *Assistant Examiner.*